US011892875B2

(12) United States Patent
Barnett et al.

(10) Patent No.: US 11,892,875 B2
(45) Date of Patent: Feb. 6, 2024

(54) MAGNETIC DOCKING PLATFORM AND DETACHABLE DOCKING ACCESSORIES

(71) Applicant: PopSockets LLC, Boulder, CO (US)

(72) Inventors: David B. Barnett, Boulder, CO (US); Altan Nahum, Boulder, CO (US)

(73) Assignee: POPSOCKETS LLC, Boulder, CO (US)

( * ) Notice: Subject to any disclaimer, the term of this patent is extended or adjusted under 35 U.S.C. 154(b) by 0 days.

(21) Appl. No.: 17/694,547

(22) Filed: Mar. 14, 2022

(65) Prior Publication Data

US 2022/0206532 A1 Jun. 30, 2022

Related U.S. Application Data

(63) Continuation-in-part of application No. 17/106,007, filed on Nov. 27, 2020, which is a continuation of
(Continued)

(51) Int. Cl.
*G06F 1/16* (2006.01)
*H01R 33/90* (2006.01)
(Continued)

(52) U.S. Cl.
CPC .......... *G06F 1/1632* (2013.01); *G06F 1/1656* (2013.01); *G06F 1/1684* (2013.01); *G06F 1/1686* (2013.01); *G06F 1/1688* (2013.01); *G06F 3/0338* (2013.01); *G06F 3/03547* (2013.01); *H01R 13/6315* (2013.01);
(Continued)

(58) Field of Classification Search
CPC ....................................................... H05K 7/00
See application file for complete search history.

(56) References Cited

U.S. PATENT DOCUMENTS 3,191,513 A 6/1965 Turner
3,901,574 A 8/1975 Paullus et al.
(Continued)

FOREIGN PATENT DOCUMENTS

DE 29908607 U1 7/1999
EP 2018030 A1 1/2009
JP 2005310447 A 11/2005

OTHER PUBLICATIONS

Transmittal of the International Search Report and Written Opinion issued in PCT/US2013/030991 dated Jul. 18, 2013.

*Primary Examiner* — Jerry Wu
(74) *Attorney, Agent, or Firm* — Irell and Manella LLP (57) ABSTRACT

A docking accessory system includes a platform having a magnetic attracting element for detachably attaching a plurality of types of accessories to a mobile electronic device, wherein the platform is integrally formed with the mobile electronic device. The docking accessory system further comprises at least a first accessory type and a second accessory type, both of which are configured to detachably attach to the platform by way of the magnetic attracting element. The first accessory type may be a battery accessory configured to wirelessly charge the mobile electronic device when magnetically attached to the platform. The mobile electronic device may be configured to perform a function based on wireless received accessory information, where the function may be specific to the accessory type.

15 Claims, 9 Drawing Sheets

Related U.S. Application Data application No. 15/852,518, filed on Dec. 22, 2017, which is a continuation-in-part of application No. 15/173,644, filed on Jun. 4, 2016, now abandoned, and a continuation of application No. 14/588,402, filed on Dec. 31, 2014, now Pat. No. 10,019,034, said application No. 15/173,644 is a continuation of application No. 14/384,663, filed as application No. PCT/US2013/030991 on Mar. 13, 2013, now Pat. No. 9,367,090.

(60) Provisional application No. 61/922,294, provisional application No. 61/610,575, filed on Mar. 14, 2012.

(51) Int. Cl.

| | | |
|---|---|---|
| *H01R 13/631* | (2006.01) | |
| *H01R 24/86* | (2011.01) | |
| *H04M 1/04* | (2006.01) | |
| *G06F 3/0338* | (2013.01) | |
| *G06F 3/0354* | (2013.01) | |
| *H04M 1/02* | (2006.01) | |
| *H01R 13/447* | (2006.01) | |
| *H01R 13/62* | (2006.01) | |
| *H01R 13/64* | (2006.01) | |
| *H01R 31/00* | (2006.01) | |
| *H01R 107/00* | (2006.01) | |

(52) U.S. Cl.
CPC ............. *H01R 24/86* (2013.01); *H01R 33/90* (2013.01); *H04M 1/04* (2013.01); *G06F 1/1628* (2013.01); *H01R 13/447* (2013.01); *H01R 13/6205* (2013.01); *H01R 13/64* (2013.01); *H01R 31/005* (2013.01); *H01R 2107/00* (2013.01); *H04M 1/0254* (2013.01)

(56) References Cited

U.S. PATENT DOCUMENTS

| | | | |
|---|---|---|---|
| 4,601,361 A | 7/1986 | Nakada | |
| 5,694,292 A | 12/1997 | Paulsel et al. | |
| 5,852,545 A | 12/1998 | Pan-Ratzlaff | |
| 7,076,270 B2 | 7/2006 | Jaggers et al. | |
| 7,303,282 B2 | 12/2007 | Dwyer et al. | |
| 8,137,192 B2 | 3/2012 | Thomas | |
| 8,183,825 B2 | 5/2012 | Sa | |
| 8,382,059 B2 | 2/2013 | Le Gette et al. | |
| 8,509,865 B1 | 8/2013 | LaColla et al. | |
| 8,560,031 B2 | 10/2013 | Barnett et al. | |
| 8,986,033 B2 | 3/2015 | Berger et al. | |
| 9,118,750 B2 | 8/2015 | Vossoughi et al. | |
| 9,136,259 B2 | 9/2015 | Pratt | |
| 9,160,189 B2 | 10/2015 | Glanzer et al. | |
| 9,360,154 B2 | 6/2016 | Le Gette et al. | |
| 9,367,090 B2 | 6/2016 | Barnett et al. | |
| 9,470,358 B2 | 10/2016 | Le Gette et al. | |
| 9,804,636 B2 | 10/2017 | Barnett et al. | |
| 10,019,034 B2 | 7/2018 | Barnett et al. | |
| 2003/0008680 A1 | 1/2003 | Huh et al. | |
| 2004/0172162 A1 | 9/2004 | Bonney et al. | |
| 2006/0214757 A1 | 9/2006 | Vom Schloss et al. | |
| 2007/0279852 A1 | 12/2007 | Daniel et al. | |
| 2008/0315990 A1* | 12/2008 | Komatsu | H04L 67/54 340/5.81 |
| 2010/0208434 A1 | 8/2010 | Kim et al. | |
| 2010/0222110 A1 | 9/2010 | Kim et al. | |
| 2010/0321899 A1 | 12/2010 | Vossoughi et al. | |
| 2011/0016494 A1 | 1/2011 | Linhardt | |
| 2011/0216485 A1 | 9/2011 | Kang et al. | |
| 2012/0190406 A1 | 7/2012 | Chen | |
| 2013/0003984 A1 | 1/2013 | Belafonte et al. | |
| 2013/0177304 A1* | 7/2013 | Chapman | G03B 17/565 396/533 |
| 2013/0198867 A1 | 8/2013 | Ricci et al. | |
| 2014/0317329 A1 | 10/2014 | Barnett et al. | |
| 2015/0072555 A1 | 3/2015 | Riddiford et al. | |
| 2015/0077927 A1 | 3/2015 | Barnett et al. | |
| 2016/0230925 A1 | 8/2016 | Le Gette et al. | |
| 2016/0282907 A1 | 9/2016 | Barnett et al. | |
| 2016/0363258 A1 | 12/2016 | Le Gette et al. | |
| 2018/0101197 A1 | 4/2018 | Barnett et al. | |
| 2018/0173275 A1 | 6/2018 | Barnett et al. | |
| 2019/0243421 A1 | 8/2019 | Barnett et al. | |
| 2020/0328017 A1 | 10/2020 | Isenberg | |

* cited by examiner

MAGNETIC DOCKING PLATFORM AND DETACHABLE DOCKING ACCESSORIES

CROSS-REFERENCE TO RELATED APPLICATIONS

This is a continuation-in-part of U.S. application Ser. No. 17/106,007, filed on Nov. 27, 2020, which is a continuation of U.S. application Ser. No. 15/852,518, filed on Dec. 22, 2017, which is a continuation of U.S. Pat. No. 10,019,034, filed on Dec. 31, 2014, which claims the benefit of U.S. Provisional Patent Application No. 61/922,294, filed Dec. 31, 2013.

U.S. application Ser. No. 15/852,518 is also a continuation-part of U.S. patent application Ser. No. 15/173,644, filed Jun. 4, 2016, which is a continuation of U.S. Pat. No. 9,367,090, filed on Sep. 11, 2014, which claims the benefit of International Patent Application No. PCT/US2013/030991, filed Mar. 13, 2013, which claims the benefit of U.S. Provisional Patent Application No. 61/610,575, filed Mar. 14, 2012.

U.S. Pat. No. 10,019,034 is also a continuation of U.S. Pat. No. 9,367,090, filed on Sep. 11, 2014, which is a national stage filing of International Patent Application No. PCT/US2013/030991, filed Mar. 13, 2013, which claims the benefit of U.S. Provisional Patent Application No. 61/610,575, filed Mar. 14, 2012.

The entire contents of each of the foregoing is incorporated herein by reference in its entirety.

FIELD OF THE DISCLOSURE

The present disclosure generally relates to a docking platform and detachable docking accessories generally, and more particularly to a docking platform integrally formed within the body of a mobile electronic device and configured to magnetically attach a plurality of types of detachable docking accessories.

BACKGROUND

Some docking accessories, such as certain back-up batteries, are manufactured as parts of mobile electronic device cases. The resultant "docking cases" attach to mobile electronic devices, both at their docking connectors (as standard docking accessories attach) and around their various sides (as standard mobile electronic device cases attach), to enable the docking accessories to be transported securely against the back surfaces of the mobile electronic devices. In a similar vein, some docking accessories are manufactured as parts of docking "sleeves" (or "jackets"), which attach to compatible mobile electronic devices at their sides and at their docking connectors. Docking cases and sleeves enable the majority of the volume of docking accessories to be distributed in a generally even manner across the relatively large back surfaces of mobile electronic devices, with the aim of minimizing effective increases in magnitude to any single dimension of the mobile electronic device and thus enabling the resultant systems to be transported in a convenient fashion.

However, such docking cases and sleeves have several drawbacks. First, docking cases and sleeves house a limited number of docking accessories—typically one; hence, the use of a broad range of docking accessories requires a broad range of docking cases. This creates unnecessary expense and hassle for consumers, who must purchase multiple docking cases and sleeves to acquire a broad range of docking accessories, and who must remove and replace an entire case in order to change the docking accessories that are connected to the docking connector. Second, docking cases and sleeves are compatible with only a single mobile device form factor. This creates unnecessary expense and hassle for consumers, who must (i) purchase a new docking case or sleeve each time they upgrade their mobile electronic device; (ii) purchase multiple docking cases and sleeves for multiple mobile electronic devices; and (iii) limit their choice of mobile electronic devices to only those that are compatible with an extant docking case or sleeve. Third, docking cases and sleeves do not typically allow multiple docking accessories to attach simultaneously and independently to the mobile electronic device. Some docking accessories, such as supplemental camera lenses and flashes, stereo speakers, and electrophysiology sensors, naturally work together in pairs, so there is a need for a method that enables multiple docking accessories of different types to attach simultaneously to the mobile electronic device. Furthermore, different circumstances might call for one and the same accessory to be paired with different partner accessories. For instance, a daytime circumstance might call for a supplemental camera lens accessory to be combined with a supplemental battery accessory, whereas a nighttime circumstance might call for the same camera lens to be combined instead with a supplemental flash accessory. So there is a need for a method that enables multiple docking accessories to attach both simultaneously and independently to the mobile electronic device.

To address the preceding docking-system problems, what is needed is a docking system configured to form a detachable accessory attachment to the back surface of a wide range of devices. The docking platform should be configured to form detachable attachments to multiple, independent, accessories. By allowing the volumes of attached accessories to be distributed across the relatively large surface areas of the back surfaces of mobile electronic devices, such a docking system would solve the docking-system problems presented by prior art cases and sleeves. Moreover, by having the capacity to form detachable attachments to a wide range of mobile electronic devices and cases, and by enabling multiple, independent, and differentiated accessories to attach temporarily to the mobile device, the docking system would avoid the shortfalls of the preceding solutions.

SUMMARY

The inventions described below address the aforementioned problems by providing a magnetic docking platform that is integrally formed with the body (e.g., back face) of a mobile electronic device to enable multiple docking accessories of various shapes and sizes to individually, simultaneously and independently magnetically attach to the mobile electronic device. Furthermore, the docking platform does not require ports or other docking openings along the edges of the mobile device.

The mobile electronic device may be a mobile phone, smartphone, electronic tablet, portable media player, or other mobile electronic device.

In an embodiment, the docking platform comprises electronics formed with a power subassembly having one or more of power storage components, power transmitting components, power receiving component.

In an embodiment, the docking platform's power storage components include a battery and the power transmitting components and the power receiving components include a wireless charging interface and charging coil.

In an embodiment, the docking platform's electronics are formed with a signal processing subassembly for signal transfer, processing, and amplification.

In an embodiment, the docking platform's signal processing subassembly is configured to process digital and/or analog signals sent from one or more docking accessories or the mobile electronic device.

In an embodiment, the docking platform's electronics include a wireless communication subassembly to provide wireless communication to one or both of the docking accessory and the mobile electronic device.

In an embodiment, the docking platform's processor subassembly executes instructions for offloading functionality from the detachable accessory docking platform to the mobile electronic device.

In an embodiment, the docking platform's offloaded functionality includes offloading communication functionality, processing functionality, display functionality, and data storage.

In an embodiment, the docking platform's processor subassembly and the mobile electronic device cooperate to offloading functionality from the mobile electronic device to the detachable accessory docking platform.

In an embodiment, the docking platform's offloaded functionality includes offloading communication functionality, processing functionality, signal processing functionality, data storage, and functionality specific to one or more docking accessories.

In an embodiment, the docking platform's power subassembly is configured to transfer power between the docking platform and one or both of the mobile electronic device and one of more attached docking accessories.

In an embodiment, the docking accessory comprises one of the following: a speaker, a battery, an electrophysiology sensor, a game controller, a solar charger, a supplemental lens, a camera, a supplemental flash, a supplemental keyboard, or a weather sensor.

In an embodiment, the docking platform system is configured to enable docking accessories to be attached in more than one orientation relative to the accessory docking system and the processor subassembly executes instructions stored in non-transient memory for selecting one of plurality of docking accessory capable functionalities based on the attached orientation of the docking accessory.

In an embodiment, the accessory docking platform system performs the method of establishing an authenticated communication link between one or more docking accessories to the docking platform or mobile device (depending on functionality offloading). The method includes the steps of determining a docking accessory is attached to the docking platform and if the attached docking accessory is electrically attached to the docking platform. The method then determines if the attached docking accessory is a wireless docking accessory. An authenticated communication link between the docking platform and the docking accessory is then established. The method then determines the type and functionality of the linked docking accessory and determining the inter-operability and/or intra-operability of attached accessories if more than two accessories are attached. A similar method may be utilized to establish an authenticated communication link between the accessory docking platform and a mobile electronic device.

In certain embodiment, a docking accessory system comprises a platform comprising a magnetic attracting element for detachably attaching a plurality of types of accessories to a mobile electronic device, wherein the platform is integrally formed with the mobile electronic device. The docking accessory system further comprises a first accessory, having a first accessory type of the plurality of types of accessories, wherein the first accessory is configured to detachably attach to the platform by way of the magnetic attracting element, and a second accessory, having a second accessory type of the plurality of types of accessories, wherein the second accessory type has a different form than the first accessory type, and wherein the second accessory is configured to also detachably attach to the platform by way of the magnetic attracting element.

The first accessory type and the second accessory type each may comprise a further magnetic attracting element configured to magnetically interact with the magnetic attracting element of the platform to form a detachable magnetic attachment therewith.

When the first accessory is a battery accessory, the first accessory is configured to wirelessly charge the mobile electronic device when magnetically attached to the platform. The platform may further comprises a charging coil to wirelessly receive power from the first accessory to charge a battery of the mobile electronic device.

In addition, the first accessory type may be configured to wirelessly transmit accessory information to the mobile electronic device, and wherein the mobile electronic device is configured to identify the first accessory type based on said wirelessly transmitted accessory information.

Moreover, the mobile electronic device may be configured to perform a function based on the accessory information, where the function may be specific to the first accessory type.

The mobile electronic device may be configured to make a determination as to whether the first accessory type is physically connected before performing the function based on the accessory information provided by the first accessory type. This determination may be made based on wireless communication with the first accessory type using a wireless communication standard having a range of no greater than 4 cm.

DETAILED DESCRIPTION

The docking platform is integrally formed with the body of the mobile electronic device. In a related embodiment, the docking platform is integrally formed with one aspect of the mobile electronic device, e.g., the back cover.

One skilled in the art will appreciate other possible embodiments, which vary in (i) shape of platform; (ii) size of platform; (iii) number of docking accessories; (iv) materials of the platform and its components. These variations are merely that, possible variations of the present invention, which exemplify only some of the possible alternative forms the present invention may take. In addition, these variations are not meant to be limiting in anyway.

An embodiment of the docking platform is formed in a selected one of two largest-surface-area surfaces of a mobile electronic device. In one or more embodiments, the docking platform may be configured to enable power and data transmission between the mobile electronic device and the docking accessories by electrical connection to the docking accessories. Alternatively, the mobile electronic device may enable at least one of power or data to be transmitted between the mobile device and the accessories through wireless technology, including via Bluetooth, Wi-Fi, Wireless USB, IrDA, Near-Field Communication (NFC), shared wireless, and/or radio frequency, among other wireless communication methods and standards.

In one or more embodiments, the docking connection system may be configured to form a detachable magnetic bond with docking accessories. In addition, micro friction surfaces, high friction surfaces, or protrusions and/or cutouts can be integrated into one or both of a magnetically attached accessory and its mating surface to inhibit motion in the perpendicular and rotational directions, relative to the normal force direction, thus further securing the accessory to the docking platform. These features can also be used to enable one of a plurality of accessory mounting orientations. In a further embodiment, switchable magnet may be used to selective attach an accessory to a docking platform or other magnetic/metal surface.

In one or more embodiments, the docking connection system might comprise a single magnetic element (or magnetic attracting element) operable to form a detachable magnetic attachment to one or more docking accessories. Alternatively, the docking connection system may be configured to form a detachable attachment to two or more independent docking accessories simultaneously.

In one or more embodiments, docking accessories may operate in a first mode of operation when connected to the docking platform and in a second mode of operation when remote from the mobile electronic device. The modes of operation depend on the type and functionality of the docking accessory.

In one or more embodiments, the selected surface in which the docking platform is formed and a docking side of the docking accessory are substantially flush when the docking accessory is attached to the docking connection system.

In one or more embodiments, a docking system according to the present invention includes a docking platform formed in a selected one of two largest-surface-area surfaces of a mobile electronic device. A docking accessory, constructed and arranged to form a detachable attachment to the docking connection system, is formed to facilitate the transmission of one or both of data and power between the mobile electronic device and the docking accessory.

In one or more embodiments, the docking connection system may be operable to form an attachment with a docking accessory without fixing the positions of the outer edges of the attached accessory.

In one or more embodiments, the docking accessory body is domed-shaped and/or formed with outer edges that are eased edges or tapered edges. These shape characteristics may reduce the likelihood of catching the docking accessory on an objects or clothing.

In one or more embodiments, the docking accessory may be formed as a battery, a solar panel, a game control, an LED light, a hand-crank charger, a weather sensor, a camera flash, a camera lens, an electrophysiology sensor, a memory card, a keyboard, a massage paddle, a glucose monitor, a body fat monitor, a breathalyzer, an ultrasound transducer, or a pulse oximeter, among other docking accessories.

In one embodiment, the docking platform is integrally formed with the body of a mobile electronic device. The docking platform includes a docking connection system, formed with a docking connector. The docking connector supports an elongated magnetic element (or magnetic attracting element) formed, for example, beneath the outermost surface of a back face of the mobile electronic device, for temporarily attaching docking accessories securely to the docking platform. The docking platform may be substantially formed of a hard material. In an embodiment, the docking platform is formed of the same material as the body of the mobile electronic device.

In one or more embodiments, the docking platform may be formed in a selected one of two largest-surface-area surfaces of a mobile electronic device and includes a docking area, a docking connection system formed therein. The docking connection system may be configured with either one or more docking connectors having a magnetic element (or magnetic attracting element) for removably attaching one or more docking accessories. The docking connector system may be support the transmission of one or both of power and data between the docking connector system and the one or more docking accessories.

In one or more embodiments, the docking connection system may include an aligning element for aligning the docking accessory.

In one or more embodiments, the docking system according to the present invention comprises a docking platform formed in a selected one of two largest-surface-area surfaces of a mobile electronic device (comprising a docking area, a docking connector formed within the docking area, the docking connector comprising a magnetic element (or magnetic attracting element) for bonding with docking accessories, and a docking accessory constructed and arranged to form a detachable attachment to the docking connector, the docking accessory further constructed to allow at least one of either data or power transmission between the mobile electronic device and the docking accessory.

Some possible docking accessories include, but are not limited to, a battery, a solar panel, a game control, an LED light, a hand-crank charger, a weather sensor, a camera flash, a camera lens, an electrophysiology sensor, a memory card, a keyboard, a massage paddle, a glucose monitor, an infrared fat monitor, a breathalyzer, an ultrasound paddle, and a pulse oximeter. This list is not meant to be exhaustive in any way, but is only meant to demonstrate some of the many possible accessories that may be adapted to present docking system.

One possible method of providing a docking accessory attachment for a mobile electronic device according to the present invention may be accomplished by forming a docking connector with a magnetic element (or magnetic attracting element) for detachably mating with a compatible docking accessory. The docking accessory is attached at a selected one of two largest-surface-area surfaces, for example the back surface, of the mobile electronic device.

The method of providing a docking accessory attachment for a mobile electronic device may further include forming two or more electrical contacts within the selected surface, and electrically connecting the contacts to electronics within the mobile electronic device. Additional step may include forming a magnetic attachment for a docking accessory within the selected surface.

The docking platform may further wirelessly receive power from, or provide power to, a battery of the mobile electronic device or may receive power from a compatible wireless charging device.

Docking accessories may, in some embodiments, communicate wirelessly with the docking platform and/or with a mobile electronic device. Docking accessories may wirelessly receive power from, or provide power to, the docking platform or mobile electronic device or may receive power from a compatible wireless charging device.

The docking platform may comprise a power transfer or power source for docking accessories and may house additional electronic subsystems.

The docking platform may be formed to accommodate a broad range of shapes, sizes, and types of docking accessories. The range of docking accessories that might be accommodated by the docking platform includes, for example, batteries, solar panels, wireless chargers, wireless charging receivers, game controls, LED lights, hand-crank chargers, weather sensors, particulate sensors, chemical sensors, pressure and weight sensors, camera flashes, camera lenses, electrophysiology sensors, memory cards and storage devices, keyboards, robotic mechanisms, glucose monitors, infrared fat monitors, breathalyzers, massage paddles, ultrasound paddles, pulse oximeters, speakers, headphones, headphone cable interfaces, general cable interfaces, stands, surface attachment mechanisms (suction cups, clips, etc.), and authorization devices, among other accessories.

Robotic mechanisms include but are not limited to, ground, air, and water maneuverable devices wired or wirelessly linked to a docking platform or mobile electronic device of the present invention. Robotic mechanisms may even support their own docking accessories as discloses herein.

In one embodiment, the docking platform comprises a docking connector comprising an elongated magnetic element (or magnetic attracting element) for temporarily attaching docking accessories securely to the docking platform (and hence to the mobile device). The docking platform is constructed to allow (i) wireless transmission of data between the mobile electronic device and attached docking accessories and (ii) power transmission between the platform and attached docking accessories.

A docking platform system according to the present invention comprises an accessory docking system and a docking accessory constructed and arranged to form a detachable attachment to the docking platform, the docking platform further constructed to form a detachable attachment to the back surface of a mobile electronic device, the docking platform further constructed to allow wireless transmission of data between the mobile electronic device and attached docking accessories, the docking platform further constructed to allow power transmission between the platform and attached docking accessories.

Figure 1A:
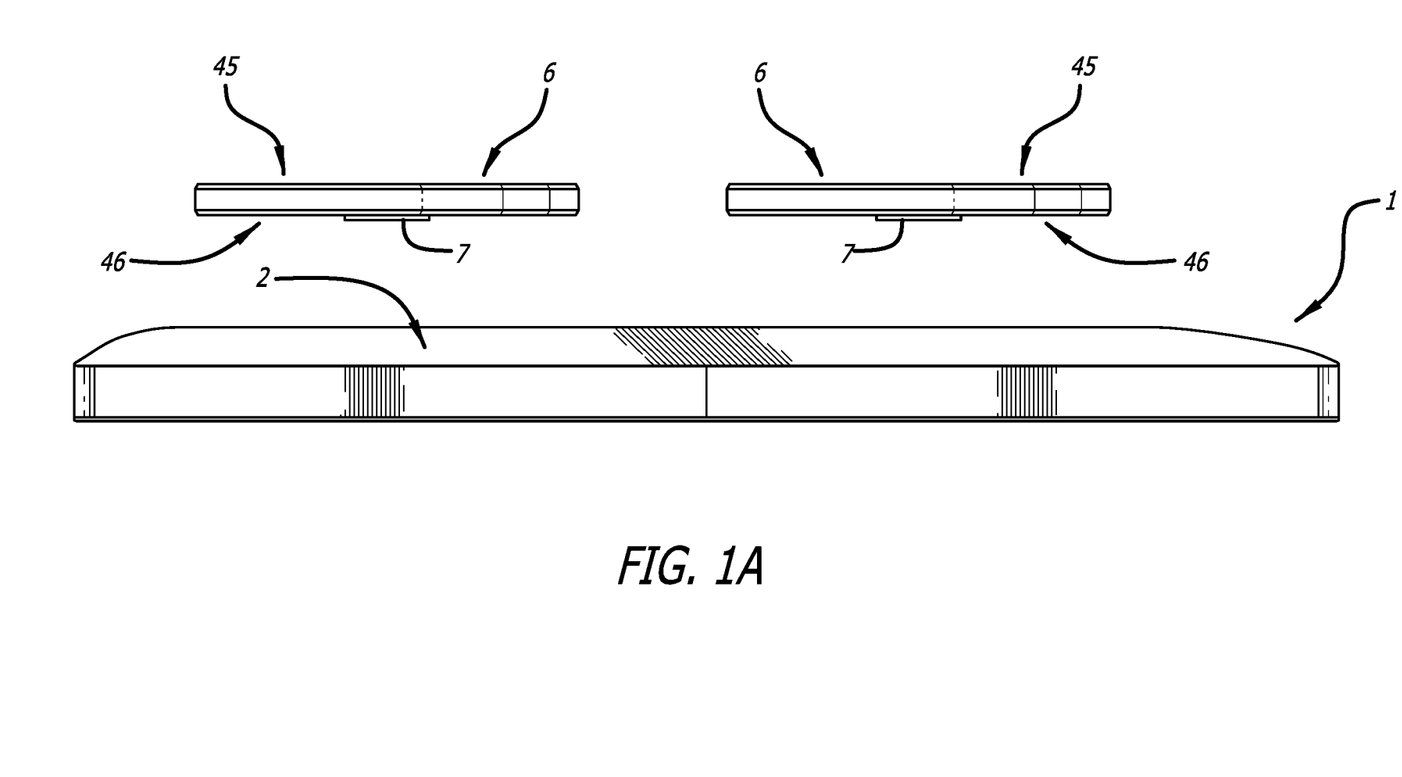
FIG. 1A is a side view of a mobile electronic device with an integrated magnetic docking platform, further illustrating two generic unattached docking accessories.
Figure 1B:
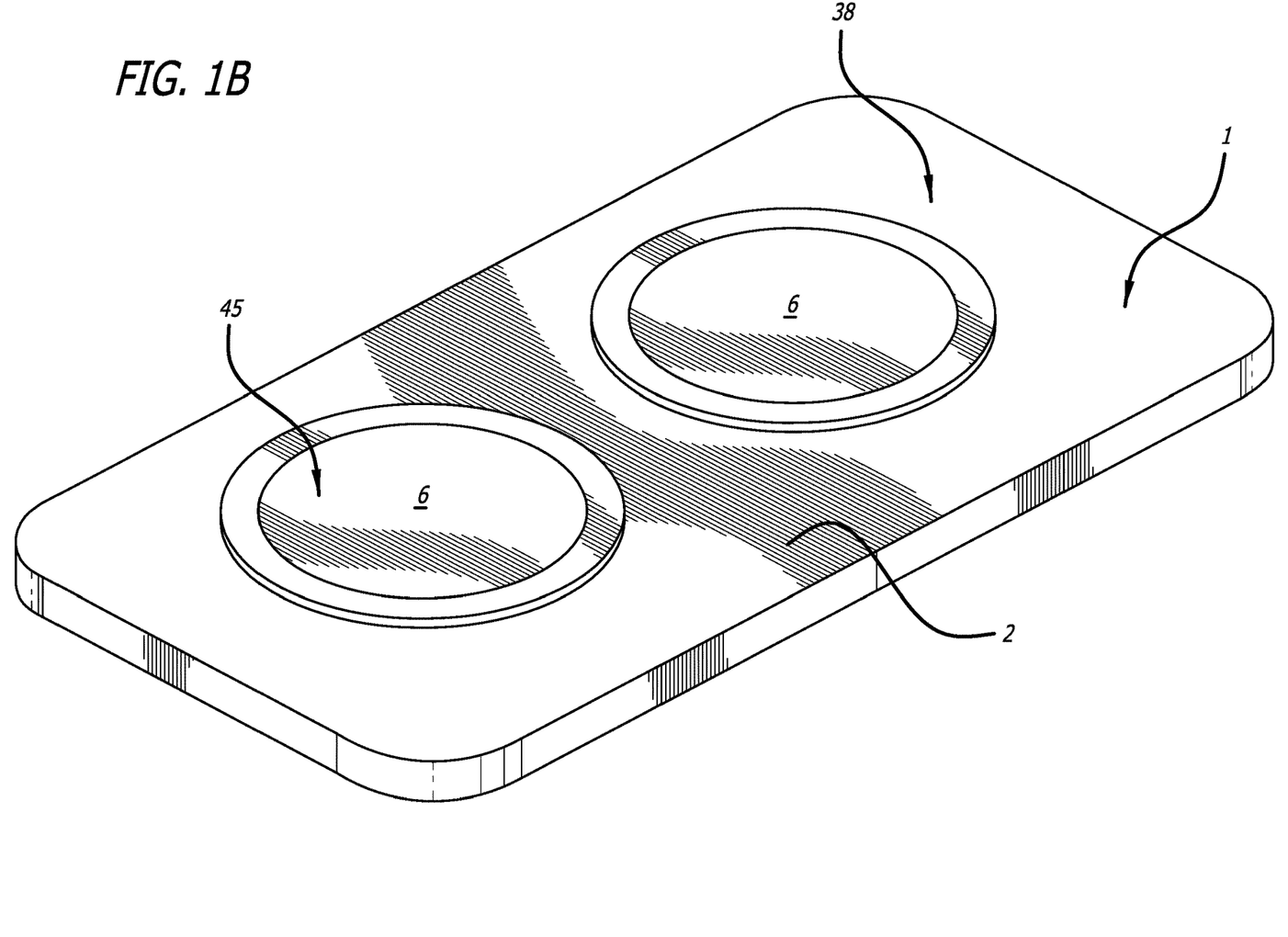
FIG. 1B is a schematic view of the embodiment of FIG. 1A.

With reference now to FIGS. 1A-1B, shows a mobile electronic device 1 with a docking platform 2 integrally formed with the mobile electronic device 1 on a rear device face 38. FIG. 1A is a side view of the mobile electronic device 1 with two unattached generic docking accessories 6, which in one embodiment are battery accessories. Each of the accessories 6 has an outward side 45 and also has a docking side 46 configured with a connector 7, where the connector 7 is a magnetic element (or magnetic attracting element) that cooperates with one or more magnetic elements (or magnetic attracting elements) (not shown) of the docking platform 2. FIG. 1B is a perspective view of mobile electronic device 1 of FIG. 1A, with docking accessories 6 shown magnetically attached with docking platform 2.

Docking platform 2 may be configured to enable power and data transmission between the mobile electronic device 1 and the docking accessories 6 by electrical connection to the docking accessories. Alternatively, the mobile electronic device 1 may enable at least one of power or data to be transmitted between the mobile device 1 and the accessories 6 through wireless technology. The docking platform 2 may particularly be configured to wirelessly receive power from, or provide power to, a battery of the mobile electronic device or may receive power from or provide power to a docking accessory when in the form of a battery accessory, as described below in more detail The docking connection system (mobile electronic device 1 and docking platform 2) is configured to form a detachable magnetic bond with the docking accessories 6.

While in the embodiment of FIGS. 1A-1B, the docking connection system is formed to magnetically a detachable attachment to two independent docking accessories simultaneously, it should be appreciated that the docking connection system may equally be configured form a detachable magnetic attachment to one docking accessory 6.

In one or more embodiments, docking accessories 6 may operate in a first mode of operation when connected to the docking platform and in a second mode of operation when remote from the mobile electronic device. The modes of operation depend on the type and functionality of the docking accessory.

The docking platform 2, integrally formed with the body of a mobile electronic device 1, comprises a docking connector in the form of one or more magnetic elements (or magnetic attracting elements) formed, for example, beneath the outermost surface of a back face of the mobile electronic device, for temporarily attaching the docking accessories 6 securely to the docking platform (and hence to the mobile device 1). In addition, the docking platform may include an aligning element for aligning the docking accessory.

Continuing to refer to FIGS. 1A-1B, one or both of the docking accessories 6 may be configured to wirelessly transmit accessory information to the mobile electronic device 1, and wherein the mobile electronic device 1 may be configured to identify the docking accessories 6 based on said wirelessly transmitted accessory information, where such information comprises detection/identification/configuration data.

Continuing to refer to FIGS. 1A-1B, one or both of the docking accessories 6 may be configured to wirelessly transmit accessory information to the mobile electronic device 1, and wherein the mobile electronic device 1 may be configured to identify the docking accessories 6 based on said wirelessly transmitted accessory information, where such information comprises detection/identification/configuration data.

In certain embodiments of FIGS. 1A-1B, identifying the accessories 6 may include, for example, determining the type and configuration of the linked docking accessory. In one example, a controller/processor subassembly of the docking platform and/or a mobile electronic device 1 identifies the docking accessories 6 using a message passing protocol between the docking accessories 6 and the docking platform 2 and/or a mobile electronic device 1.

In certain embodiments of FIGS. 1A-1B, a message passing protocol may be used to determine the types and level of cooperation/interoperability between the docking platform 2 and/or a mobile electronic device 1, on the one hand, and the one or more docking accessories 6 on the other hand using, for example, the method described below in connection with FIG. 5, which is incorporated here by reference.

In certain embodiments of FIGS. 1A-1B, the docking platform 2 and/or a mobile electronic device 1 may be configured to perform a function based on the wirelessly transmitted accessory information, where the function may be specific to the type of accessory. In certain embodiments, the docking platform 2 and/or a mobile electronic device 1 may be configured to perform one or more functions, depending on the number, type, configuration, and operability mode(s) of one or more of the docking accessories 6. This functionality may be provided in accordance with the method described below in connection with FIG. 5, which is incorporated here by reference.

Figure 2A:
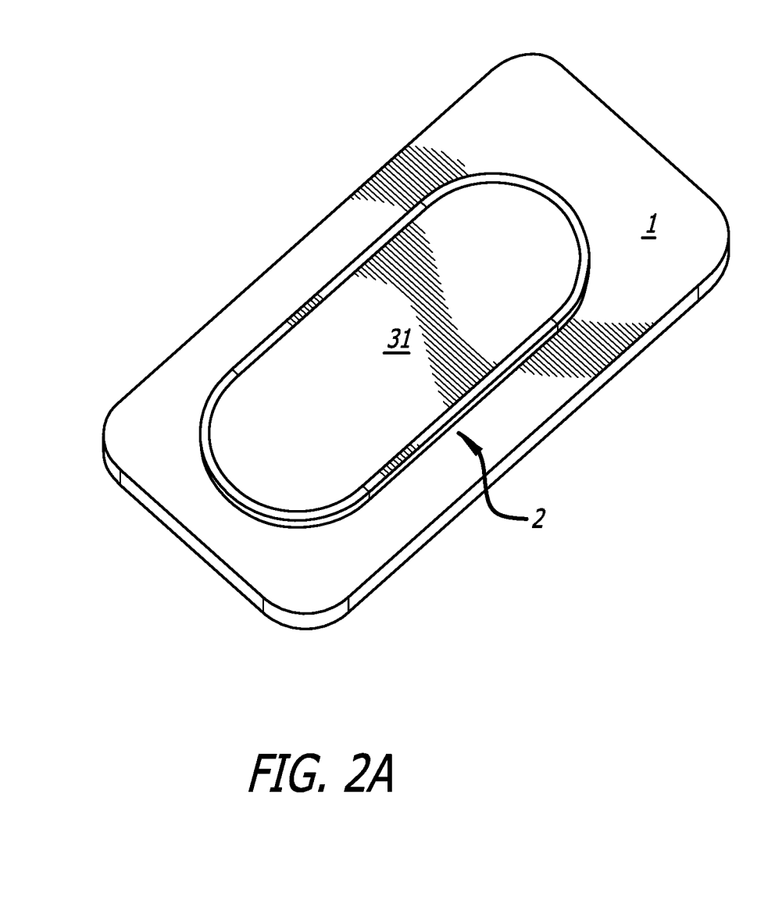
FIG. 2A is a back perspective view of the mobile electronic device of FIG. 1A with a docked supplemental battery accessory.
Figure 2B:
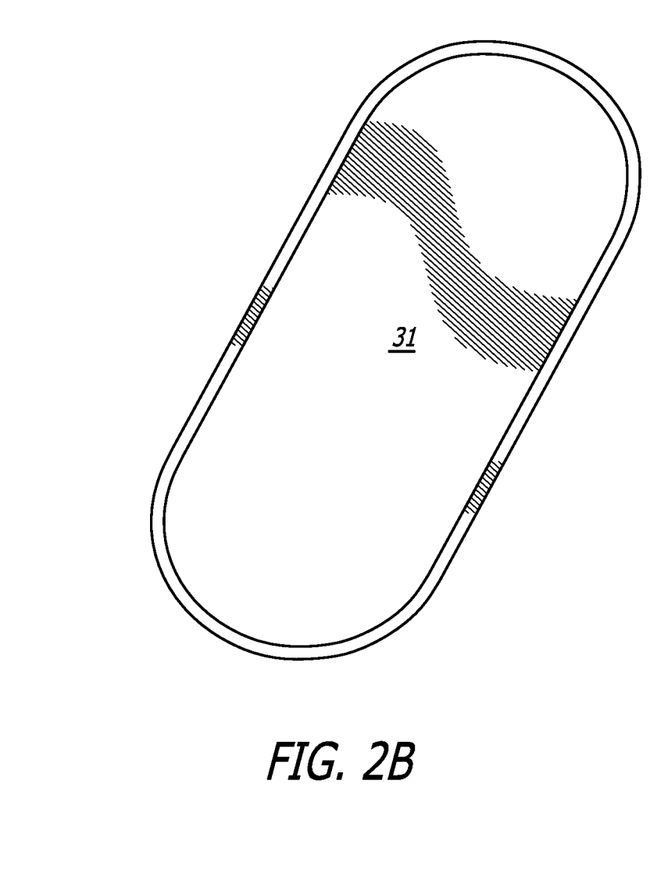
FIG. 2B is a top view of the supplemental battery accessory of FIG. 2A.

FIG. 2A depicts a back perspective view of the mobile electronic device 1 of FIG. 1A wherein the docking accessories 6 are configured as a battery accessory 31. FIG. 2B is a top view of the battery accessory 31 of FIG. 2A. As with the generic accessories 6 of FIGS. 1A-1B, the docking platform 2 of FIGS. 2A-2B is integrally formed with the mobile electronic device 1 on a rear device face. Also, as with the accessories 6 of FIGS. 1A-1B, the battery accessory 31 is configured with a connector (not shown) in the form of a magnetic element (or magnetic attracting element) that cooperates with one or more magnetic elements (or magnetic attracting element) of the docking platform 2.

As described above, the docking platform 2 of FIGS. 2A-2B may be configured to enable power transmission between the mobile electronic device 1 and the battery accessory 31. The mobile electronic device 1 may also enable data to be transmitted between the mobile device 1 and the battery accessory 31 through wireless technology, including, for example, via Bluetooth, Wi-Fi, Wireless USB, IrDA, Near-Field Communication (NFC), shared wireless, and/or radio frequency, among other wireless communication methods and standards. In particular, the docking platform 2 of FIGS. 2A-2B may be particularly configured to wirelessly receive power from, or provide power to, a battery of the mobile electronic device 1 or may receive power from or provide power to the battery accessory 31.

The docking accessory 31 may operate in a first mode of operation when connected to the docking platform and in a second mode of operation when remote from the mobile electronic device. The modes of operation depend on the type and functionality of the docking accessory.

The docking platform 2, integrally formed with the body of a mobile electronic device 1, comprises a docking connector in the form of one or more magnetic elements (or magnetic attracting element) formed, for example, beneath the outermost surface of a back face of the mobile electronic device 1, for temporarily attaching the battery accessory 31 securely to the docking platform (and hence to the mobile device 1). In addition, the docking platform 2 may include an aligning element for aligning the battery accessory 31.

Continuing to refer to FIGS. 2A-2B, one or both of the docking accessory 31 may be configured to wirelessly transmit accessory information to the mobile electronic device 1, and wherein the mobile electronic device 1 may be configured to identify the docking accessory 31 based on said wirelessly transmitted accessory information, where such information comprises detection/identification/configuration data.

Continuing to refer to FIGS. 2A-2B, docking accessory 31 may be configured to wirelessly transmit accessory information to the mobile electronic device 1, and wherein the mobile electronic device 1 may be configured to identify the docking accessory 31 based on said wirelessly transmitted accessory information, where such information comprises detection/identification/configuration data.

In certain embodiments of FIGS. 2A-2B, identifying the docking accessory 31 may include, for example, determining the type and configuration of the accessory 31. In one example, a controller/processor subassembly of the docking platform and/or a mobile electronic device 1 identifies the docking accessory 31 using a message passing protocol between the docking accessory 31 and the docking platform 2 and/or a mobile electronic device 1.

In certain embodiments of FIGS. 2A-2B, a message passing protocol may be used to determine the types and level of cooperation/interoperability between the docking platform 2 and/or a mobile electronic device 1, on the one hand, and the docking accessory 31 on the other hand using, for example, the method described below in connection with FIG. 5, which is incorporated here by reference.

In certain embodiments of FIGS. 2A-2B, the docking platform 2 and/or a mobile electronic device 1 may be configured to perform a function based on the wirelessly transmitted accessory information, where the function may be specific to the type of accessory. In certain embodiments, the docking platform 2 and/or a mobile electronic device 1 may be configured to perform one or more functions, depending on the number, type, configuration, and operability mode(s) of the docking accessory 31. This functionality may be provided in accordance with the method described below in connection with FIG. 5, which is incorporated here by reference.

Figure 3:
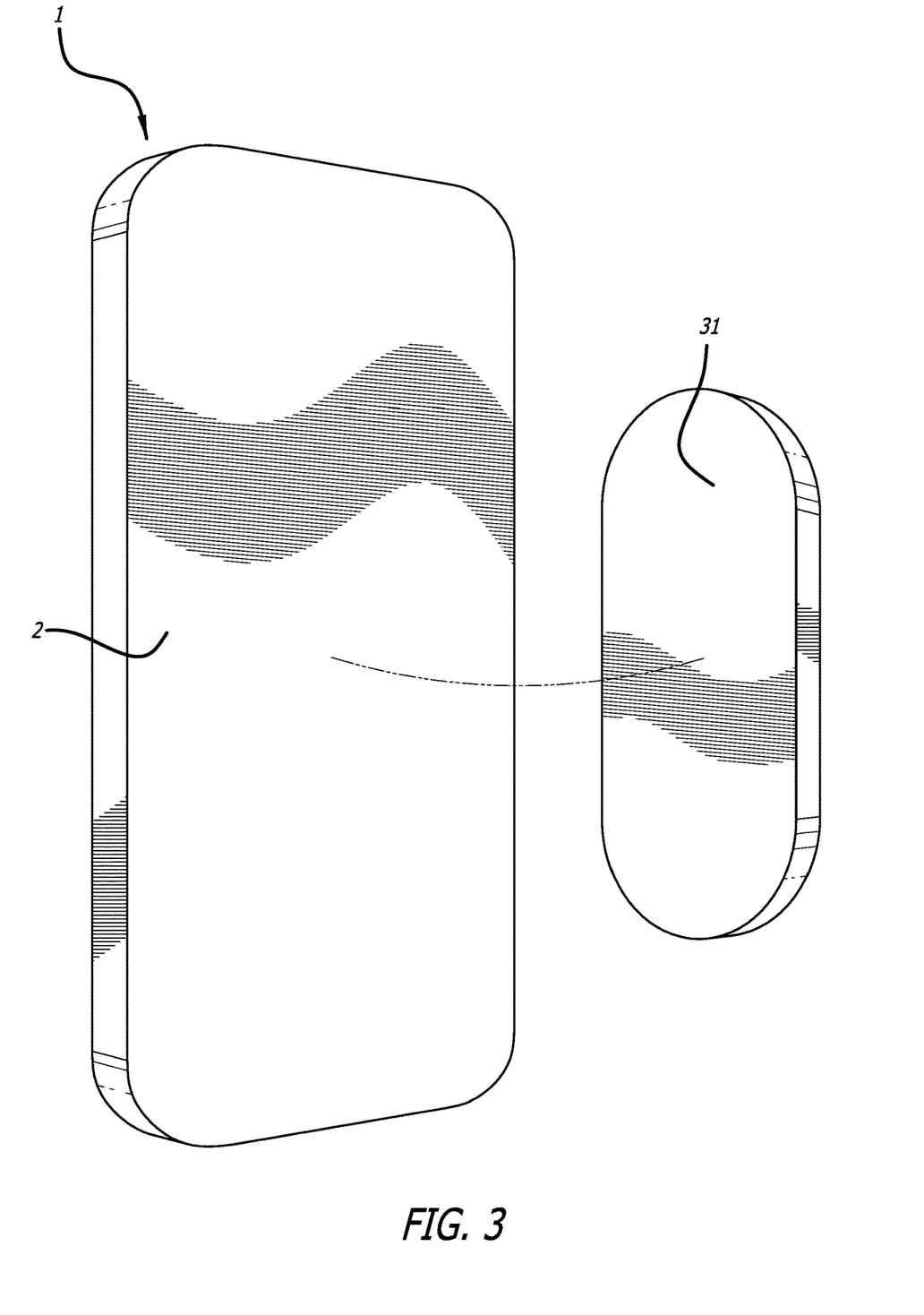
FIG. 3 is a perspective view of a docking platform system, showing the mobile electronic device of FIGS. 1A, 1B, and 2A, and the battery docking accessory of FIG. 2B in a detached state.

FIG. 3 is a perspective view of a docking platform system, showing the mobile electronic device 1, with integrally formed docking platform 2, of FIGS. 1A, 1B, and 2A, and the battery accessory 31 of FIG. 2B in a detached state.

Figure 4:
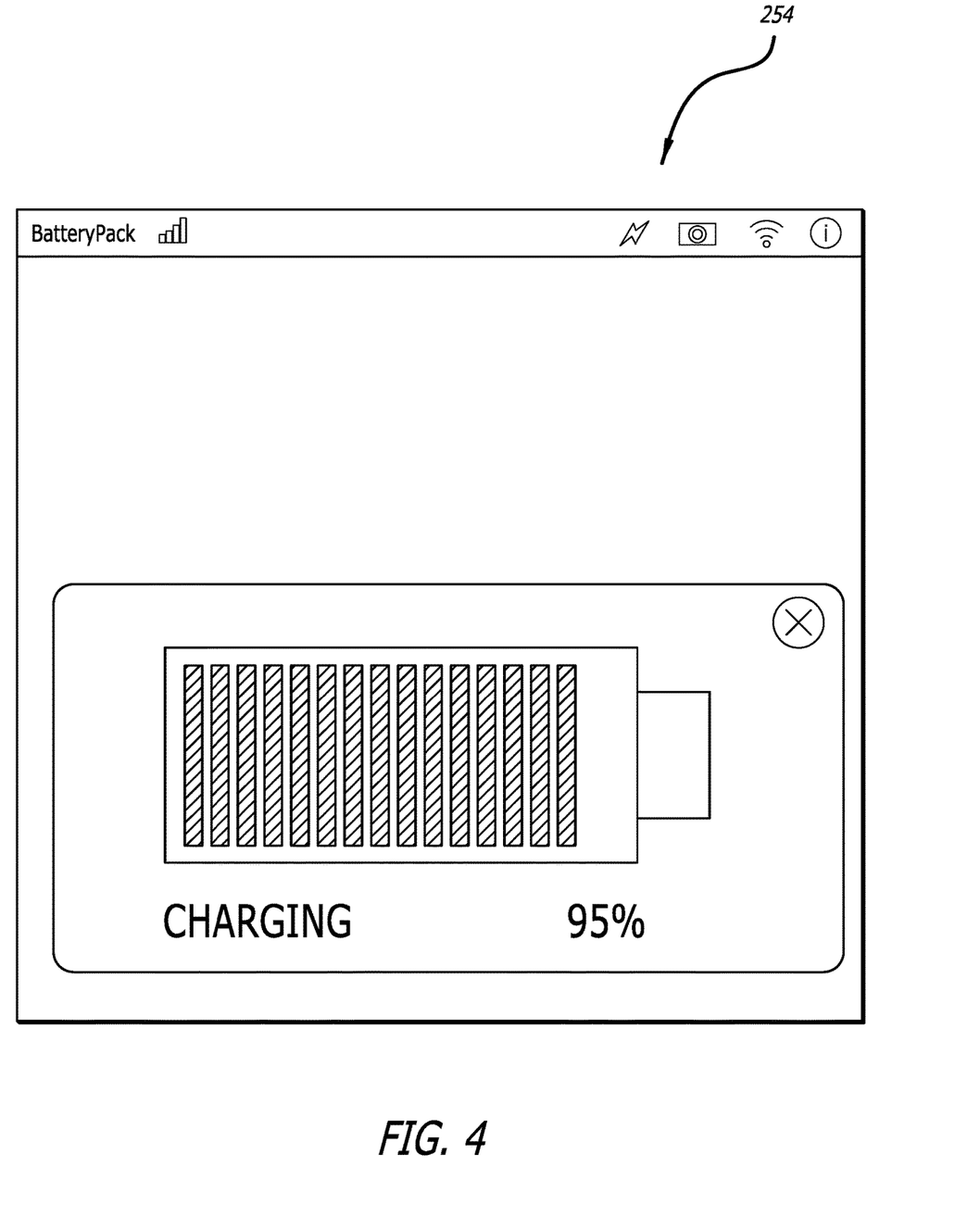
FIG. 4 illustrates a display of data corresponding to a battery accessory as may be sensed by the mobile electronic device of FIGS. 1A, 1B, 2A, and 3 and presented on a screen thereof.

FIG. 4 illustrates a display of data corresponding to a battery accessory as may be sensed by the mobile electronic device of FIGS. 1A, 1B, 2A, and 3 and presented on a screen thereof. In particular, FIG. 4 shows an exemplary battery function 254 performed by docking platform 2 or mobile electronic device 1. After docking platform 2 or mobile electronic device 1 establishes communications with supplemental battery accessory 31, docking platform 2 or mobile electronic device 1 may display battery function 254.

Figure 5:
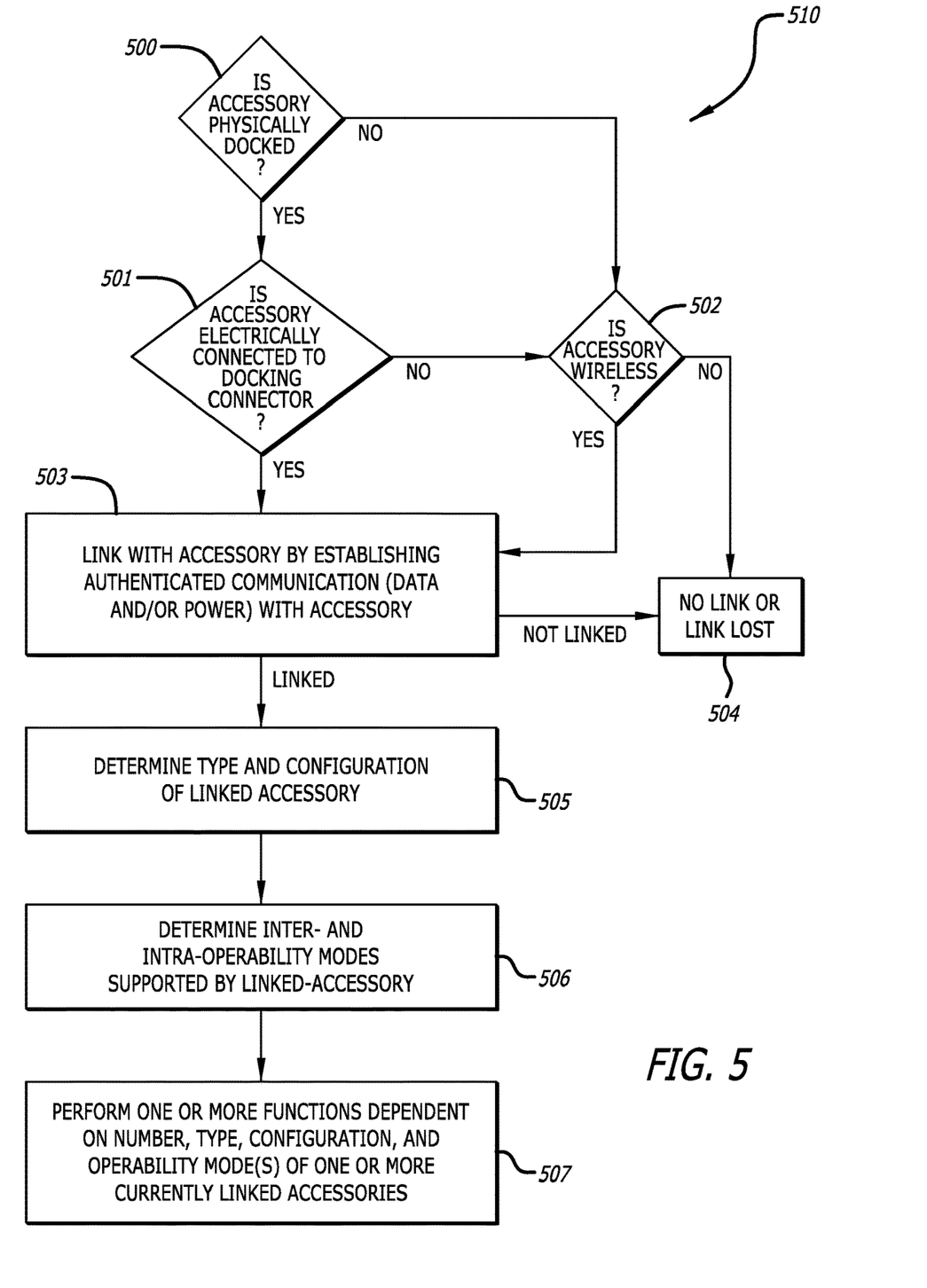
FIG. 5 is a flow chart detailing functionality associated with an embodiment of the docking system hereof.

FIG. 5 is a flow chart detailing functionality associated with an embodiment of the docking system hereof. In particular, FIG. 5 a flowchart 510 detailing a method of establishing a link between one or more docking accessories and a docking platform (e.g., docking platform 2) and/or a mobile electronic device (e.g., mobile electronic device 1). In addition, with only minor modifications the present method could be adapted to directly or indirectly linking one or more accessories, a docking platform, and a mobile electronic device to each other.

At step 500, method 510 may determine if a docking accessory is physically docked to a compatible a docking platform (e.g., docking platform 2) and/or a mobile electronic device (e.g., mobile electronic device 1). If so, method 510 moves to step 501, otherwise method 510 moves to step 502.

At step 501, method 510 determines if the docking accessory is electrically connected to the docking platform (e.g., docking platform 2) and/or a mobile electronic device (e.g., mobile electronic device 1). In one example of step 501, a controller/processor subassembly of the docking platform (e.g., docking platform 2) and/or a mobile electronic device (e.g., mobile electronic device 1) may determine that the accessory in question is electrically connected. Electrical connection may be for purposes of communication or the transfer of power. If method 510 determines that there is no electrical contact made, method 510 moves to step 502, otherwise method 510 moves to step 503.

At step 502, method 510 determines if the docking accessory supports one or more of wireless communication and wireless power transfer. If in step 502, method 510 determines the docking accessory is not a wireless accessory, method 510 moves to step 504, where no data or power link is formed and no further action is taken. If in step 502, method 510 determines that the docking accessory is a wireless docking accessory, step 502 moves to step 503. In one example of step 502, a controller/processor subassembly of the docking platform (e.g., docking platform 2) and/or a mobile electronic device (e.g., mobile electronic device 1) determines that docking accessory is a wireless accessory such as a wireless camera accessory or a wireless battery accessory.

At step 503, method 510 attempts to establish an authenticated communication link with the docking accessory. If no link can be established, method 510 moves to step 504, and no further action takes place, otherwise, once linked, method 510 moves to step 505. In one example of step 503, a wireless communication subassembly of the docking platform (e.g., docking platform 2) and/or a mobile electronic device (e.g., mobile electronic device 1) establishes a communication link between docking platform and the docking accessory by any one of know methods. It will be appreciated by one skilled in the art that docking accessories and docking platforms of the present invention, may be wireless linked to more than one other device (e.g., a computer, an docking accessory, a mobile device, a different docking platform, etc.), for example, to act as an intermediary, for purposes of coordination, cooperation, and/or communication, or for unrelated communications.

At step 505 of method 510, the linked docking accessory is identified, including for example by determining the type and configuration of the linked docking accessory. In one example, a controller/processor subassembly of the docking platform (e.g., docking platform 2) and/or a mobile electronic device (e.g., mobile electronic device 1) determines that a docking accessory is one version of camera accessory or battery accessory. Determining the type and configuration of a linked docking accessory may be done by, for example, a message passing protocol between the docking accessory and the docking platform (e.g., docking platform 2) and/or a mobile electronic device (e.g., mobile electronic device 1). The linked docking accessory may be identified based on wirelessly transmitted information from the docking platform 2 and/or mobile electronic device 1, where such information comprises detection/identification/configuration data. Method 505 then moves to step 506.

At step 506, method 510 determines, for example by utilizing a message passing protocol, the types and level of cooperation/interoperability between the docking platform and the one or more docking accessories. In one example, the docking platform (e.g., docking platform 2) and/or a mobile electronic device (e.g., mobile electronic device 1) determines that a docking accessory supports one or more interoperability modes, for example a camera accessory that interoperates with a flash accessory. In another example, docking platform 2 determines that a docked speaker accessory can interoperate with another docked speaker accessory to form a left and right stereo speaker pair or a bass and treble speaker pair. Alternative, the docking platform (e.g., docking platform 2) and/or a mobile electronic device (e.g., mobile electronic device 1) determines there is not cooperation/interoperability between the attached docking accessories. In still another example, the docking platform (e.g., docking platform 2) and/or a mobile electronic device (e.g., mobile electronic device 1) determines the docking accessory is a single docking accessory, like a game controller accessory, a battery accessory, or solar charger accessory. Method 510 then moves to step 507.

At step 507, method 510 performs one or more functions, depending on the number, type, configuration, and operability mode(s) of one or more currently docked docking accessories. In one example of step 507, the docking platform (e.g., docking platform 2) and/or a mobile electronic device (e.g., mobile electronic device 1) initializes functionality to enable a speaker accessories to cooperate by designating one speaker accessory as a right speaker and the other speaker accessory as a left speaker and transmitting left and right channel amplified signals so speaker accessories function as a stereo speaker system. In another example, the docking platform (e.g., docking platform 2) and/or a mobile electronic device (e.g., mobile electronic device 1) includes functionality to enable a camera accessory and a flash accessory to coordinate such that a flash is delivered under low light conditions when an image capture event is signaled. In still another example, a wireless link is established at step 503, and a wireless scale may operate, in one embodiment, independently of any docked accessories.

It will be understood that a linked accessory does not need to be continuously connected to its docking platform or mobile electronic device, but can, after linking, be located at a position spaced away from the linked docking platform or mobile electronic device. Some examples of locating a linked accessory at a position spaced from the linked docking platform or mobile electronic device include, but are not limited to cameras accessories, audio speaker accessories, physiological sensing accessories, motion detector accessories, GPS accessories, etc.

Figure 6:
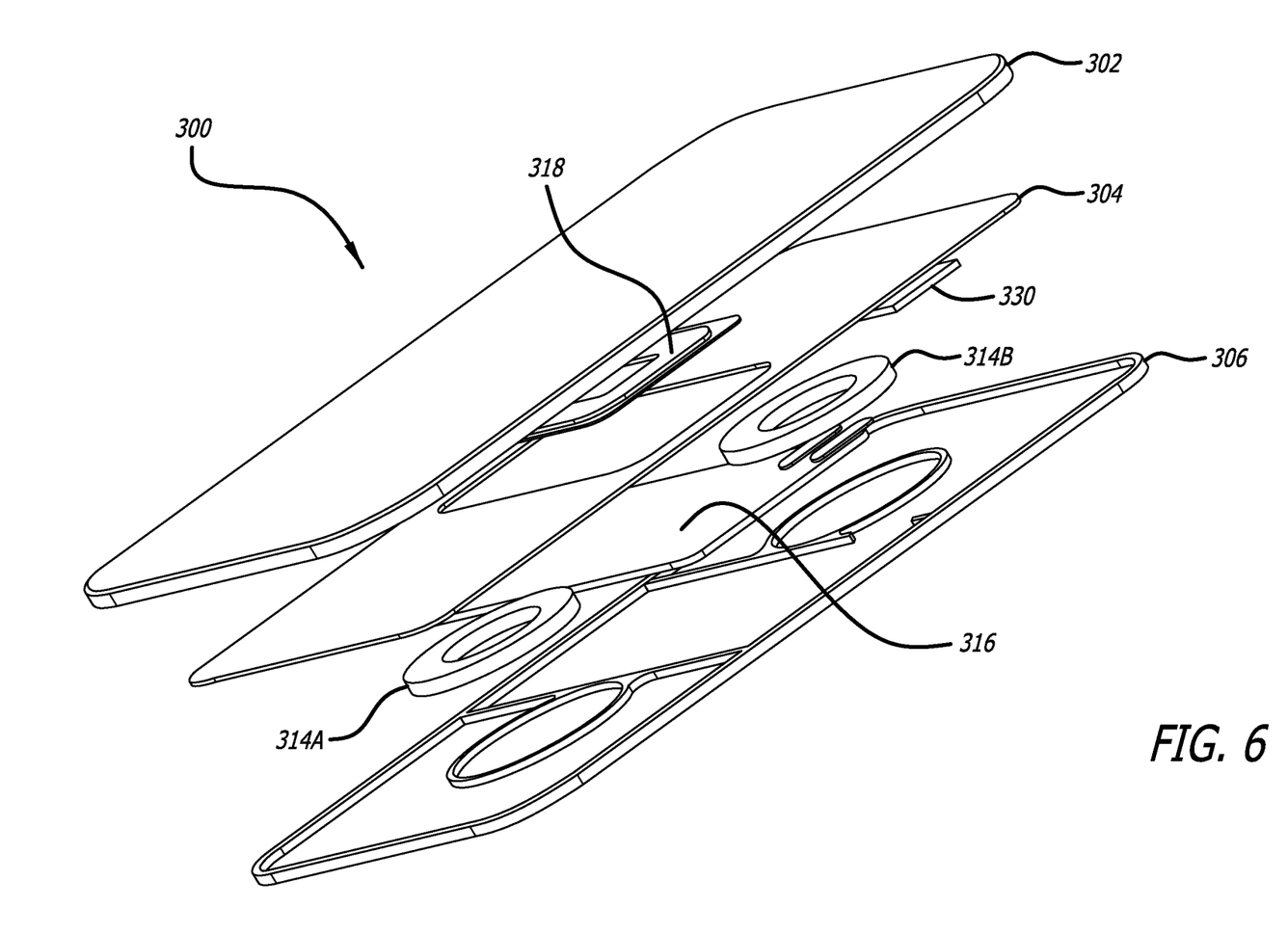
FIG. 6 is an exploded perspective view of the integrated magnetic docking platform of FIGS. 1A, 1B, 2, and 3, according to an embodiment.
Figure 7:
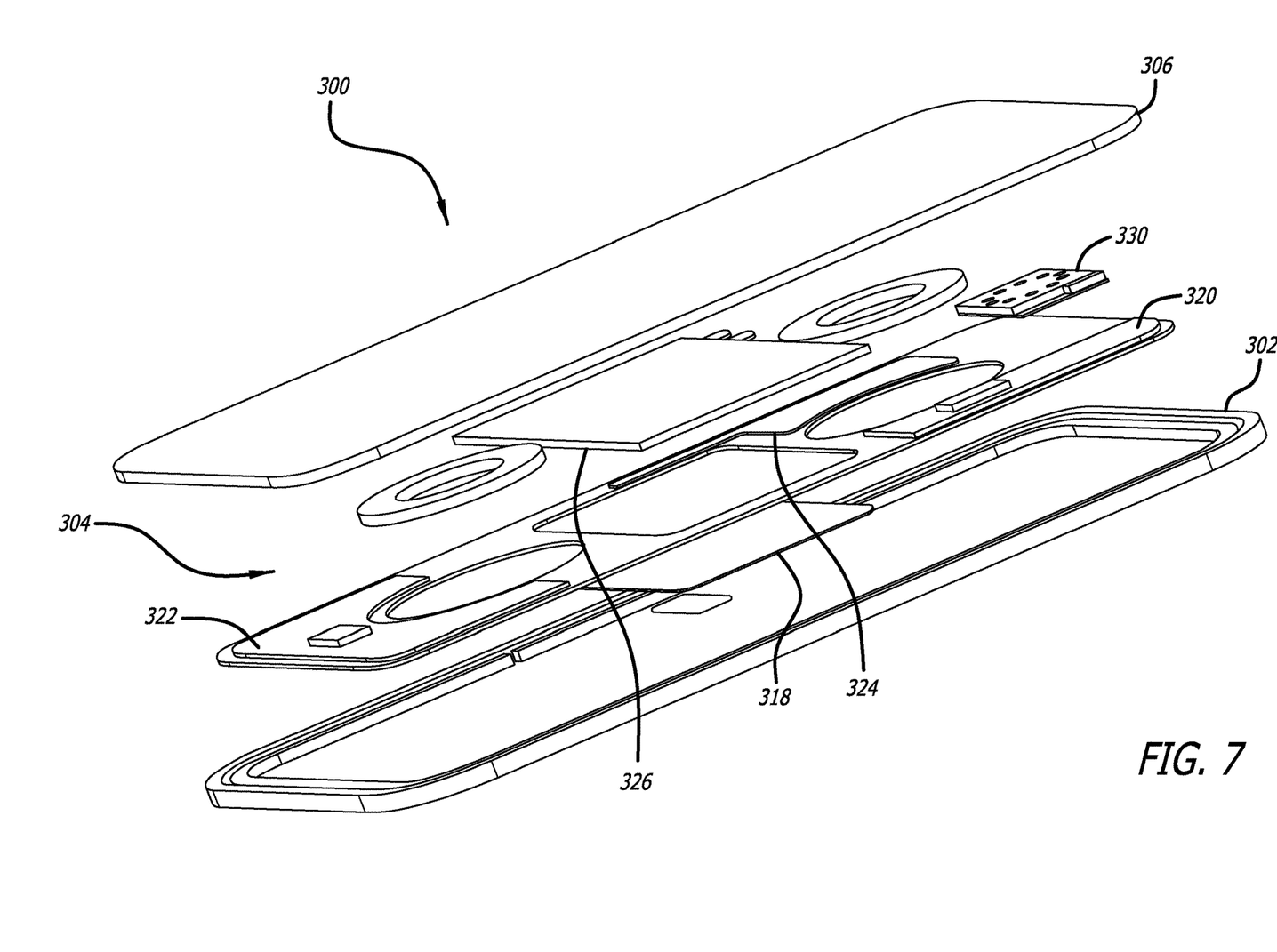
FIG. 7 is an additional exploded perspective view of the integrated magnetic docking platform of FIGS. 1A, 1B, 2, and 3, according to an embodiment.
Figure 8:
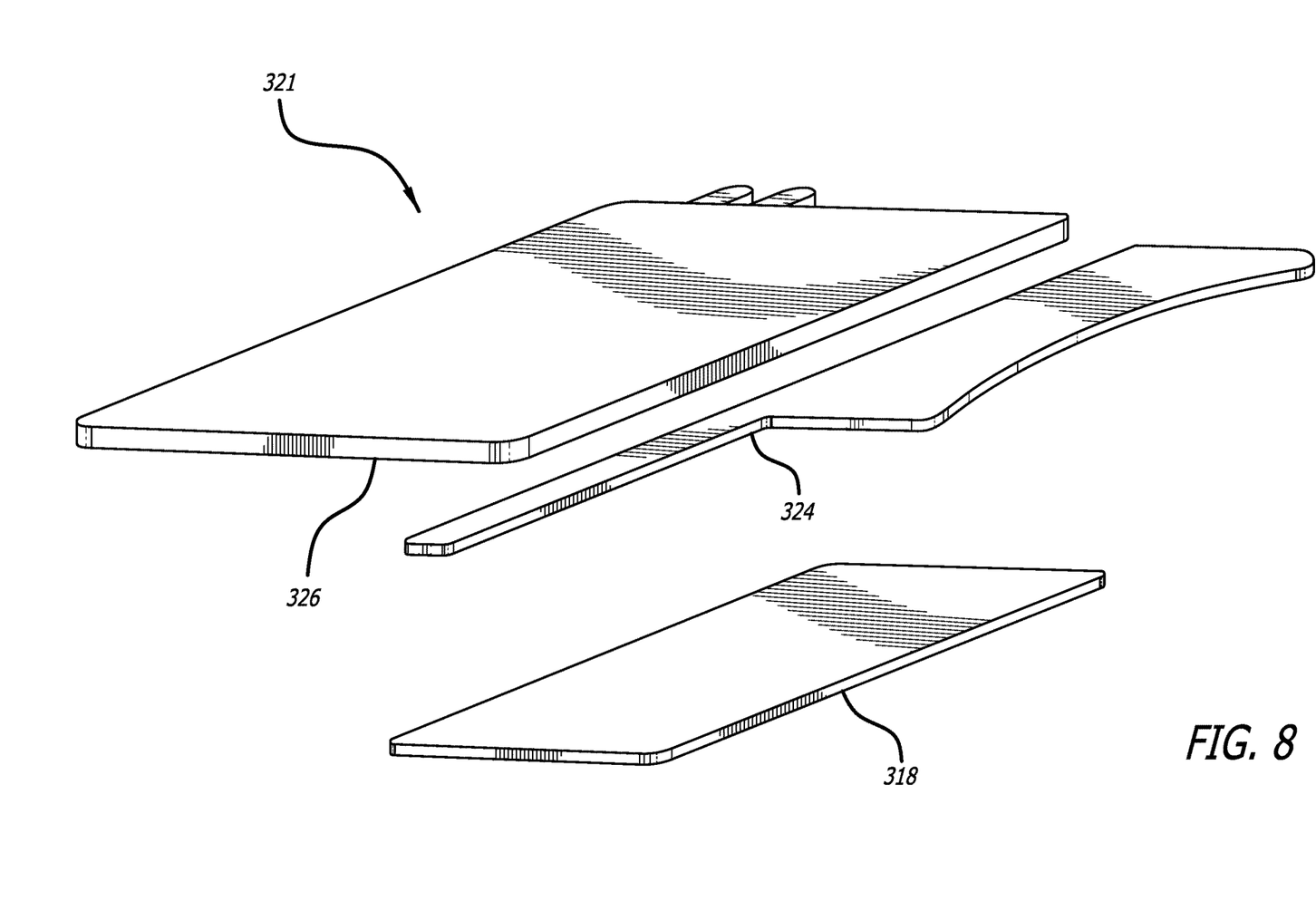
FIG. 8 is an exploded view of a power subassembly of the docking platform of FIGS. 6-7.

FIGS. 6-8 depict exploded perspective views of one or more components comprising the magnetic docking platform of FIGS. 1A, 1B, 2, and 3, configured to be integrally formed with a mobile electronic device (e.g., mobile electronic device 1), according to an embodiment. In particular, docking platform 300 comprises magnets 314A, 314B, an electronic assembly 304, and enclosures 302, 306. It should be appreciated that, because the docking platform 300 is integrally formed within the body of a mobile electronic device, as described above with respect to docking platform 2, enclosures 302 and/or 306 may be optional and/or formed by a back surface of the mobile electronic device The electronic assembly 304 enables data transfer, signal transfer, power transfer, power generation, processing, and/or control, among other functions. To carry out these functions, electronic assembly 304 is formed with one or more electronic subassemblies, including but not limited to a controller/processor subassembly 320; a power subassembly 321 (see FIG. 8 for an isolated power subassembly 321 exploded view); a signal processing subassembly 322 for at least signal transfer, processing, and amplification; memory; and/or a wireless communication subassembly 330. In addition, one or both of electronic assembly 304 and wireless communication subassembly may include a first communication system for communicating with an attached docking accessory and a second communication system for communicating with the mobile electronic device. The first and second communication systems may be wired or wireless, or both wired and wireless.

In an alternative embodiment, electronic functions may be differently consolidated and/or distributed within the docking platform without departing from the scope herein.

In a further embodiment, the docking platform may merely provide pass-through functions and/or may include minimal or no active electronics.

A power subassembly may include power storage, generating, and/or receiving components, among other power-related components and functionality. FIG. 8 shows one exemplary power subassembly 321 formed of power electronics and a battery 326, wireless charging interface 324, and charging coil 318. Alternative embodiments of power subassembly 321 may be formed with more or fewer components or different combination of components without departing from the scope herein. Power assembly 321 includes power electronics and a battery 326 to optionally power electronic assembly 304 and/or attached docking accessories. Power subassembly 321 may also include a wireless charging interface 324 configured to receive and/or transmit wireless power. For example, wireless charging interface 324 may be configured to receive an electrical charging signal from a wireless charging coil 318, formed, for example, by flat-coiling a thin conductive wire. Charging coil 318 may optionally include a shield (not shown) to isolate charging currents from electronic circuits and leads.

In an embodiment, charging coil 318 includes a core and/or membrane of powdered iron or other material formed to, for example, reduce eddy currents and reduce interference by permanent magnets. Optionally, charging coil 318 may be configured to receive a wireless power signal from a charging station equipped with a compatible wireless charging generating coil. Note that a power transfer function may be included in power subassembly 321 to provide power to (and/or receive power from) attached docking accessories, for example, a charging accessory or a docked accessory with sharable power (e.g., battery accessory 31).

Wireless communication subassembly 330 may be configured for wireless transfer of digital data, among other purposes. Wireless communication module 330 may communicate with a mobile electronic device and/or attached/detached docking accessories via Bluetooth, Wi-Fi, Wireless USB, IrDA, Near-Field Communication (NFC), shared wireless, and/or radio frequency, among other wireless communication methods and standards. Communication may also be indirect communication, for example, via the Internet or some intermediary device(s), either through wired or wireless means. One example of such indirect communication is the situation where a linked docking accessory is spaced away from its associated docking platform or mobile electronic device, such as a camera accessory configured as a remote security camera. In alternative embodiments, docking accessories detachably attached to the docking platform may wirelessly communicate directly with the mobile electronic device, obviating the need for, or use of, a wireless communication subassembly housed within the docking platform.

Controller/processor subassembly 320 may include any specialized functions, including communications support functions. For example, communications to and from docking accessories may be processed or pre-processed within the docking platform for the purpose of, for example, authorizing docking accessories, linking and initializing docking accessories, gaining software access to mobile electronic devices (using a hardware "key" docking accessory, for example), offloading communication functions from a mobile electronic device, offloading processing or non-transient data storage to the mobile electronic device, and/or implementing special functions based on an attached docking accessory type, among other purposes. Alternatively, such functionality may not be offloaded from the mobile electronic device (e.g., mobile electronic device 1).

Signal processing subassembly 322 may include functions for transferring, distributing, altering, quantifying, processing, and amplifying analog signals, among other functions. In some embodiments, the docking platform may include the capability of conductively transferring analog and/or digital signals to and from docking accessories to and/or from the mobile electronic device.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of various embodiments. This description should be read to include one or at least one and the singular also includes the plural unless it is obvious that it is meant otherwise.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A docking accessory system, comprising:
    a platform comprising an electronic assembly enclosed by a rear external surface of a mobile electronic device, and a magnetic attracting element for detachably attaching a plurality of types of accessories to the mobile electronic device, wherein the platform is integrally formed with the mobile electronic device;
    a first accessory, having a first accessory type of the plurality of types of accessories, wherein the first accessory is configured to detachably attach to the platform by way of the magnetic attracting element, wherein the first accessory is a battery accessory configured to wirelessly charge the mobile electronic device when magnetically attached to the platform, and wherein the platform further comprises a charging coil to wireless receive power from the battery accessory to charge a battery of the mobile electronic device; and
    a second accessory, having a second accessory type of the plurality of types of accessories, wherein the second accessory type is a different type than wirelessly charging of the first accessory type, and wherein the second accessory is configured to also detachably attach to the platform by way of the magnetic attracting element,
    wherein the mobile electronic device is configured to make a determination as to whether the first accessory type is physically attached to the rear external surface based on wireless communication with the first accessory type using a wireless communication standard having a range of no greater than 4 cm.

2. The docking accessory system of claim 1, wherein the first accessory type and the second accessory type each comprises a further magnetic attracting element configured to magnetically interact with the magnetic attracting element of the platform to form a detachable magnetic attachment therewith.

3. The docking accessory system of claim 1, wherein the first accessory type is configured to wirelessly transmit accessory information to the mobile electronic device, and wherein the mobile electronic device is configured to identify the first accessory type based on said wirelessly transmitted accessory information.

4. The docking accessory system of claim 3, wherein the accessory information comprises one or more of an accessory type, an accessory configuration, and a level of interoperability.

5. The docking accessory system of claim 3, wherein the accessory information is transmitted by the first accessory type to the mobile electronic device using a message passing protocol.

6. The docking accessory system of claim 3, wherein the mobile electronic device is configured to perform a function based on the accessory information.

7. The docking accessory system of claim 6, wherein the function is specific to the first accessory type.

8. The docking accessory system of claim 6, wherein the platform further comprises an aligning element for aligning one or more of the plurality of types of accessories.

9. The docking accessory system of claim 6, wherein the mobile electronic device is configured to make a determination as to whether the first accessory type is physically attached before performing the function based on the accessory information provided by the first accessory type.

10. A docking accessory system, comprising:
    a platform comprising an electronic assembly enclosed by a rear external surface of a mobile electronic device, and a magnetic attracting element for detachably attaching a plurality of types of accessories to the mobile electronic device, wherein the platform is integrally formed with the mobile electronic device, wherein the platform further comprises a charging coil to wirelessly receive power from the first accessory to charge a battery of the mobile electronic device;
    a first accessory having a further magnetic attracting element configured to magnetically interact with the magnetic attracting element of the platform to form a detachable magnetic attachment therewith, wherein the first accessory is a battery accessory configured to wirelessly charge the mobile electronic device when magnetically attached to the platform; and a second accessory, that is a different type than wirelessly charging of the first accessory, and wherein the second accessory is configured to also detachably attach to the platform by way of the magnetic attracting element, wherein the mobile electronic device is configured to make a determination as to whether the first accessory type is physically attached to the rear external surface based on wireless communication with the first accessory type using a wireless communication standard having a range of no greater than 4 cm.

11. The docking accessory system of claim 10, wherein the first accessory is configured to wirelessly transmit accessory information to the mobile electronic device, and wherein the mobile electronic device is configured to identify at least one of a type and configuration of the first accessory based on said wirelessly transmitted accessory information.

12. The docking accessory system of claim 11, wherein the accessory information is transmitted by the first accessory type to the mobile electronic device using a message passing protocol.

13. The docking accessory system of claim 11, wherein the mobile electronic device is configured to perform a function specific to battery accessories based on the accessory information.

14. The docking accessory system of claim 13, wherein the platform further comprises an aligning element for aligning one or more of the plurality of types of accessories.

15. The docking accessory system of claim 13, wherein the mobile electronic device is configured to make a determination as to whether the first accessory is physically attached to the mobile device before performing the function.

* * * * *